United States Patent [19]

Oikawa et al.

[11] Patent Number: 4,898,031

[45] Date of Patent: Feb. 6, 1990

[54] VIBRATIONAL ANGULAR VELOCITY SENSOR

[75] Inventors: Takahiro Oikawa; Yoshiyuki Suzuki; Tatsumi Ohtsuka, all of Shizuoka, Japan

[73] Assignee: Yazaki Corporation, Japan

[21] Appl. No.: 222,751

[22] Filed: Jul. 22, 1988

[30] Foreign Application Priority Data

| Jul. 24, 1987 | [JP] | Japan | 62-112723[U] |
| Jul. 24, 1987 | [JP] | Japan | 62-112724[U] |
| Jul. 24, 1987 | [JP] | Japan | 62-112726[U] |
| Jul. 24, 1987 | [JP] | Japan | 62-112728[U] |
| Jul. 24, 1987 | [JP] | Japan | 62-183741 |
| Jul. 24, 1987 | [JP] | Japan | 62-183743 |

[51] Int. Cl.$^4$ .............................. G01P 15/08
[52] U.S. Cl. .................................... 73/505
[58] Field of Search ............... 73/505; 313/561; 417/48

[56] References Cited

U.S. PATENT DOCUMENTS

| 3,789,673 | 2/1974 | Berlin et al. | 73/505 |
| 3,913,405 | 10/1975 | Ljung et al. | 73/505 |
| 4,019,391 | 4/1977 | Ljung | 73/505 |
| 4,592,235 | 6/1986 | Fink | 73/517 R |
| 4,750,364 | 6/1988 | Kawamura et al. | 73/505 |

FOREIGN PATENT DOCUMENTS

| 0141621 | 10/1984 | European Pat. Off. . |
| 600165 | 9/1945 | United Kingdom . |
| 647895 | 7/1947 | United Kingdom . |
| 685369 | 4/1950 | United Kingdom . |

*Primary Examiner*—John Chapman
*Assistant Examiner*—Robert P. Bell
*Attorney, Agent, or Firm*—Wigman & Cohen

[57] ABSTRACT

To increase the stability and sensitivity of a vibrational angular velocity sensor, the vibrator is airtightly housed within a glass vacuum casing whose inside surface is coated with a metallic film. Further, conductive lead pins electrically connected between vibrator signal terminals and a printed circuit board for a signal processing circuit and fixing pins mechanically fixed to the printed circuit board are arranged with a constant length outside the casing in parallel to each other. Further, two vibrator support pins are fixed to the glass casing by glass material. To obtain a high vacuum within the glass casing, a subcasing including a getter is connected to the casing through a connecting tube cut off or sealed after evacuation.

7 Claims, 4 Drawing Sheets

VIBRATIONAL ANGULAR VELOCITY SENSOR

BACKGROUND OF THE INVENTION

1. FIELD OF THE INVENTION

The present invention relates to a vibrational angular velocity sensor used for detecting a travel direction of an automotive vehicle, for instance.

2. Description of the Prior Art

Conventionally, there exists a prior-art vibrational angular velocity sensor assembly 30 as shown in FIG. 1(A).

In the drawing, the numeral 31 denotes a vibrational angular velocity sensor which can output an electric signal according to a rotational force applied to the vibrating sensor. When a driving signal is applied to a piezoelectric element 31a, a vibrator 31b on which the piezoelectric element 31a is coated is vibrated with its support pins 31c as nodes. The numeral 32 denotes an upper casing lid; 33 denotes support plates; 34 denotes a casing. The upper casing lid 32, the support plates 33 and the casing 34 are made of a metal such as Ni-Cr alloy. The vibrational angular velocity sensor 31 is disposed within the casing 34, fixed by the support plates 33, and covered by the upper casing lid 32.

Although the prior-art vibrational angular velocity sensor is constructed as described above, since the vibrational angular velocity sensor is subjected to the influence of temperature or humidity, there exists a problem in that the output selectivity drifts according to change in temperature and/or humidity. Therefore, the sensor is usually installed within a constant temperature tank.

However, when a constant temperature tank is used, there exists a problem in that the size of the assembly is large; the structure is complicated; and the influence of viscous resistance due to air within the constant temperature tank is not negligible.

Further, to evacuate a casing 34 into a high vacuum, getter is usually placed within the casing 34 and burnt away to heighten the degree of vacuum. However, when the getter is simply placed within the casing and then burnt, there exists a problem in that the angular velocity vibrator 31b is heated and therefore the characteristics thereof are deteriorated. In addition, there exists another problem in that when a getter is placed within the casing 34, the size of the casing increases.

Further, in the prior-art angular velocity sensor, when the casing 34 is made of metal, there exists a problem in that the vibrator housed within the casing is subjected to the influence of external radiant heat.

On the other hand, FIG. 1(B) shows a prior-art vibrational angular velocity sensor assembly 30 connected to a detection signal processing circuit 40. In the drawing, a vibrational angular velocity sensor assembly 30 is connected to a printed circuit board 40 on which a circuit is formed to process detection signals outputted from the vibrational angular velocity sensor 31 in a support casing 50 for fixing the vibrational angular velocity sensor assembly 30 and the printed circuit board 40 together. Further, the vibrational angular velocity sensor assembly 30 and the printed circuit board 40 are connected to each other by conductive wires (not shown).

In the prior-art vibrational angular velocity sensor assembly 30 connected to the circuit board 40, since the signal wires of the sensor are led out by conductive wires, it has been necessary to mechanically fix the vibrational angular velocity sensor assembly 30 and the signal processing circuit board 40 to the support casing 50 separately before connecting both electrically. Therefore, there exist problems in that the number of parts increases and it takes much wiring time or assembly time. Further, since relatively long conductive wires are used, there exists a problem in that the sensor is subjected to the influence of external noise.

Further, with reference to FIG. 1(A), since the casing 34 is made of metal in the prior-art vibrational angular velocity sensor, external heat is readily conducted to the element inside the casing. Therefore, external temperature changes are readily transmitted through the support pin 31c to the vibrator 31b when an end of the support pin 31c for supporting the vibrator 31b is in contact with an outer air at the edge of the casing 34.

SUMMARY OF THE INVENTION

With these problems in mind, therefore, it is the primary object of the present invention to provide a vibrational angular velocity sensor not subjected to the influence of external temperature, humidity, or viscous resistance due to air to improve sensor selectivity and stability.

It is another object of the present invention to provide a method of evacuating a casing of a vibrational angular velocity sensor without being subjected to the influence of heat generated from the getter.

It is another object of the present invention to provide a vibrational angular velocity sensor not subjected to the influence of external radiant heat.

It is another object of the present invention to provide a vibrational angular velocity sensor which can eliminal conductive wires connecting the sensor assembly to a signal processing circuit board to reduce noise generated through the conductive wires, while facilitating the assembly work with the signal processing circuit board.

It is another object of the present invention to provide a vibrational angular velocity sensor which can eliminate a prior art support casing for mechanically connecting the vibrational sensor assembly to the processing circuit board, that is, whose vibrator is directly connectable to the processing circuit board.

It is another object of the present invention to provide a vibrational angular velocity sensor which can eliminate the influence of external heat transmitted from the outside to the sensor vibrator through the vibrator support pins.

To achieve the above-mentioned objects, the vibrational angular velocity sensor according to the present invention comprises: (a) an angular velocity vibrator; and (b) a vacuum casing for housing said angular velocity vibrator in a vacuum. The vacuum casing is made of glass.

To achieve the above-mentioned objects, the method of evacuating a casing of a vibrational angular velocity sensor into a vacuum according to the present invention comprises the steps of: (a) connecting the casing for housing a vibrational angular velocity vibrator to a subcasing including a getter through a connecting tube; (b) reducing pressure within the casing and the subcasing; (c) burning out the getter within the subcasing; and (d) sealing and cutting off the connecting tube from the subcasing.

To achieve the above-mentioned objects, the vibrational angular velocity sensor according to the present invention comprises a vacuum casing coated with a metallic film on the inside surface of the casing to shut off external radiant heat.

To achieve the above-mentioned objects, the vibrational angular velocity sensor according to the present invention further comprises a plurality of conductive lead pins connected to signal terminals of the angular velocity vibrator, the ends of said conductive leads pins being arranged with a constant length outside said vacuum casing.

To achieve the above-mentioned objects, the vibrational angular velocity sensor according to the present invention further comprises a plurality of fixing pins fixed to a printed circuit board for a velocity sensor signal processing circuit, the ends of said fixing pins being arranged with a constant length outside said vacuum casing.

To achieve the above-mentioned objects, the vibrational angular velocity sensor according to the present invention comprises at least one support pin, fixed to said glass casing by glass material within said vacuum casing, for supporting said angular velocity vibrator.

BRIEF DESCRIPTION OF THE DRAWINGS

The features and advantages of the vibrational angular velocity sensor according to the present invention will be more clearly appreciated from the following description of the preferred embodiment of the invention taken in conjunction with the accompanying drawings in which.

DETAILED DESCRIPTION OF THE PREFERRED EMBODIMENTS

Figure 1A:
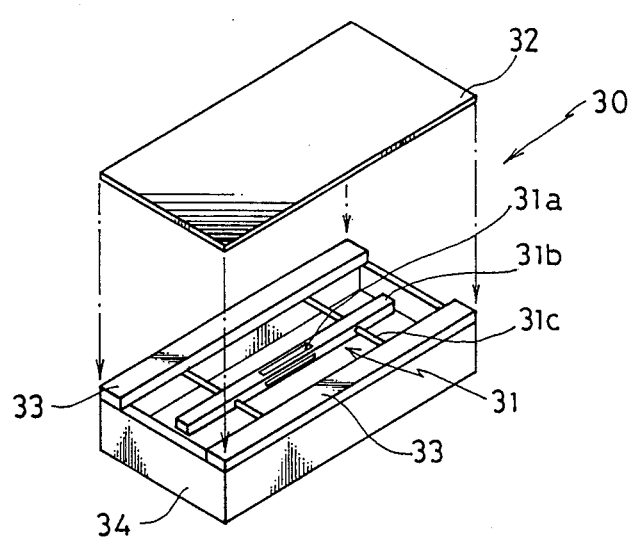
FIG. 1(A) is a perspective view showing a prior-art vibrational angular velocity sensor assembly.
Figure 1:
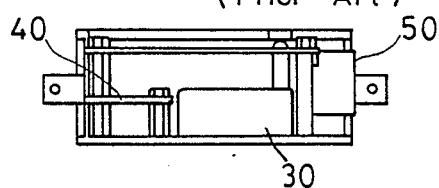
FIG. 1(B) indicates three (top, front and side) views showing a prior-art vibrational angular velocity sensor including a sensor assembly and a printed circuit board both housed within a support casing together.
Figure 1:
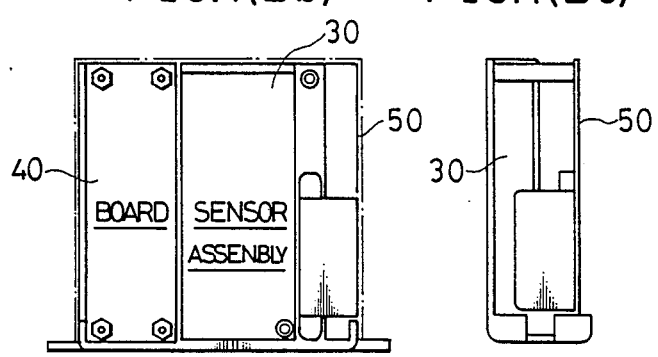
Figure 2:
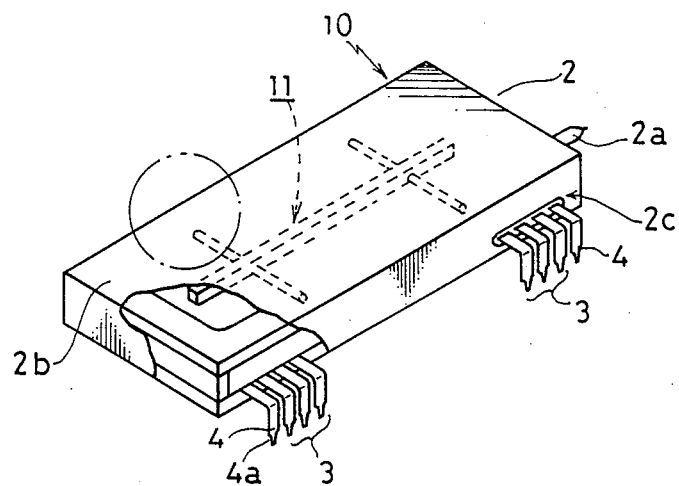
FIG. 2 is a perspective view showing a vibrational angular velocity sensor assembly according to the present invention.

FIG. 2 shows an embodiment of the vibrational angular velocity sensor assembly 10 according to the present invention, which comprises a vibrational angular velocity vibrator 11; a glass casing 2 formed with a connecting tube 2a whose end is airtightly closed after evacuation, and a plurality of lead pins 3 for guiding signal wires of the vibrational angular velocity vibrator 11 toward the outside of the casing 2.

In FIG. 2, the inside of the casing 2 is coated with a metallic film 2b by vacuum deposition. However, in FIG. 2, a part of a metallic coating film 2b is peeled off from the inner surface of the casing 2. Further, the metallic coating film 2b is not formed near the lead pins 3 by masking these positions during vacuum deposition, thus preventing a short between these lead pins 3. Further, near the lead pins 3, fixing pins 4 used for only fixing the sensor assembly 10 to a printed circuit board are provided.

When the metallic film 2b is formed on the inside surface of the casing 2 as described above, since the external radiant heat is reflected therefrom, it is possible to reduce the influence of heat irradiated upon the vibrational angular velocity vibrator 11 disposed within the casing 2.

By the aid of these lead pins 3, the signal wires of the vibrational angular velocity vibrator 11 are connected to a signal processing circuit fabricated on a printed circuit board, and the vibrational angular velocity sensor assembly 10 is fixed to the printed circuit board by the fixing pins 4 not connected to signal wires.

Figure 5:
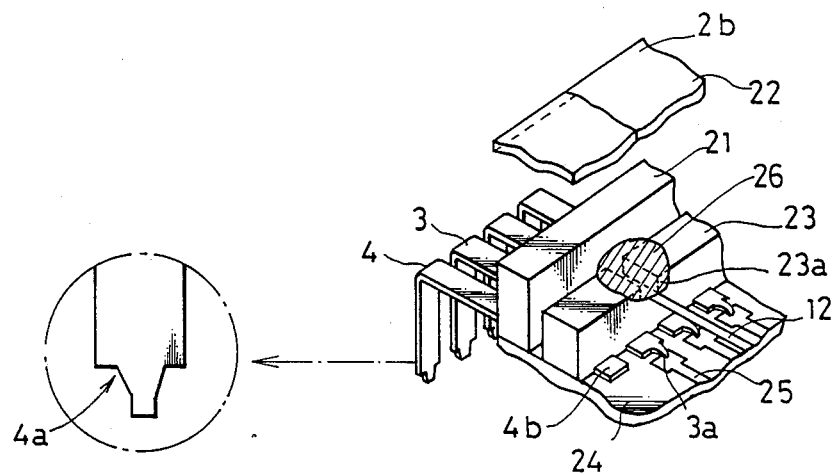
FIG. 5 is an enlarged perspective view showing a part of the sensor casing of the sensor shown in FIG. 2.
Figure 7:
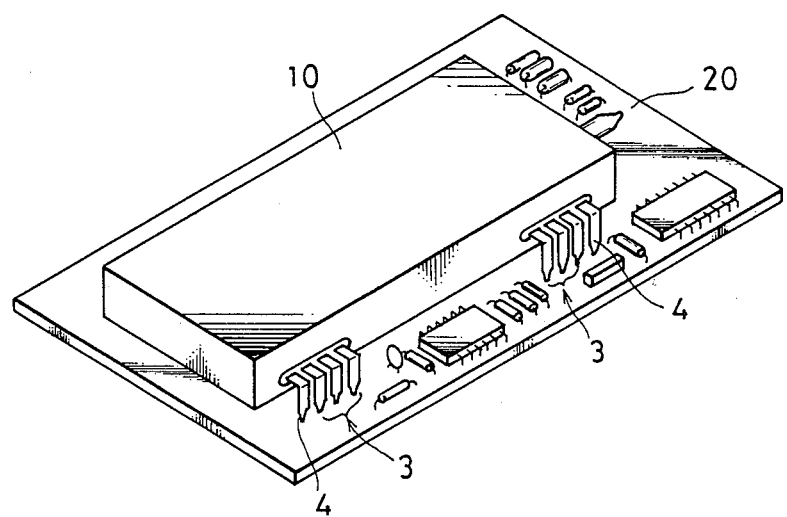
FIG. 7 is a perspective view for assistance in explaining the method of connecting the sensor assembly to a printed circuit board according to the present invention.

In more detail with reference to FIG. 7, the fixing pins 4 are only used to fix the velocity sensor assembly 10 to a printed circuit board 20 on which various circuit elements are arranged. As shown in FIG. 5, it is preferable to form a shoulder portion 4a at each end of the lead pins 3 or the fixing pins 4, so that the sensor assembly 10 can be correctly mounted on the circuit board 20 at a constant height relative to the printed circuit board 20.

Figure 3:
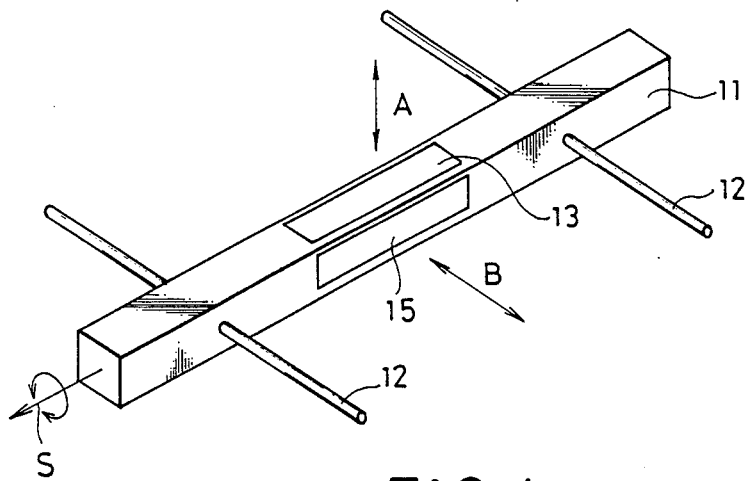
FIG. 3 is a perspective view showing a vibrator of the vibrational angular velocity sensor assembly shown in FIG. 2.
Figure 4:
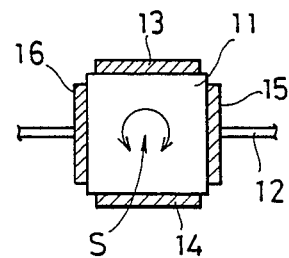
FIG. 4 is a cross-sectional view of the vibrator shown in FIG. 3.

FIG. 3 shows the above-mentioned vibrational angular velocity sensor 11, and FIG. 4 is a cross-sectional view thereof.

In the drawings, the vibrator 11 is formed into a square post shape and made of a constant elasticity material such as Ni-Span-C, etc. A pair of parallel holes are formed at a predetermined interval on the side surfaces of the vibrator 11. The holes are formed at node positions when the vibrator 11 vibrates in the basic mode. Therefore, the vibrator 11 is supported by two support pins 12 fitted into these holes and vibrated in basic mode.

To vibrate the vibrator 11, an exciting element 13 such as piezoelectric element is attached on the surface in which no vibration support holes are formed, and a feedback piezoelectric element 14 is attached on a surface opposite to that on which this exciting element 13 is attached. This feedback piezoelectric element 14 detects the vibrational intensity of the vibrator 11. The detection signal is fed back to an exciting circuit for the exciting element 13 to control the vibrator 11 so as to be vibrated at a constant amplitude.

On the other hand, a reading element 15 and a damping element 16 are attached on the two opposing surfaces perpendicular to the surfaces on which the exciting element 13 and the feedback piezoelectric element 14 are attached. On the basis of an output signal from this reading element 15, angular velocity can be detected.

That is, when the vibrator 11 is excited by the exciting element 13 and therefore vibrated in the fundamental mode with the support pins 12 as nodes, since the vibrator 11 is vibrated in the direction A perpendicular to that in which the reading element 15 can sense the vibration, no output signal will be outputted from the reading element 15. However, once a rotational force is applied to the vibrator 11 about the vibrator axis S, the vibrator 11 is vibrated in the sensing direction B of the reading element 15.

Since the intensity of this vibration is proportional to Coriolis force, an electric signal proportional to an inputted angular velocity can be outputted from the reading element 15, so that it is possible to detect an angular velocity applied to the vibrator.

FIG. 5 shows in detail the vicinity of the support pin 12 (enclosed by a hatched circle in FIG. 2) disposed within the vibrational angular velocity sensor.

In the drawing, the reference numeral 21 denotes a casing outer frame; 22 denotes an upper casing lid; 23 denotes a fixing base formed with a groove 23a to which the support pin 12 is fitted; and 24 denotes a substrate. The casing outer frame 21, the upper casing lid 22, the fixing base 23, and the substrate 24 are all made of glass.

As shown in FIG. 5, in the vibrational angular velocity sensor, an end 3a of the lead pin 3 is connected to the terminal 25 formed on the substrate 24 and connected to a signal wire of the vibrational angular velocity vibrator 11. However, the inner end 4b of the fixing pin 4 is not connected to the terminal 25. Further, these lead pins 3 and the fixing pins 4 are sandwiched between the substrate 24, the fixing base 23, and the casing outer frame 21.

An end of the support pin 12 is fitted into the groove 23a formed in the fixing base 23 and fixed by a fixing glass material (e.g. glass frit) 26 as shown in the hatched circle in FIG. 5. Further, the casing outer frame 21 is fixed to the upper casing lid 22, and also the support pin 12 and the vibrator 11 are airtightly enclosed within the casing.

Further, the lead pins 3 and the fixing pins 4 led out toward the outside from the side surface of the casing 2 are bent downward, and the ends thereof are arranged with a constant length so as to be soldered onto the printed circuit board for connection and fixing to the printed circuit board.

Therefore, this vibrational angular velocity sensor assembly 10 can easily be mounted on the signal processing circuit. In addition, since no long conductive wire is used, it is possible to reduce the influence of noise.

Further, as shown in FIG. 7, this vibrational angular velocity sensor assembly 10 is fixed on a printed circuit board 20 of the signal processing circuit by use of these arranged fixing lead pins 4. Further, each pin is formed with a shoulder portion 4a (FIG. 5) to fix the sensor assembly body 10 at a constant height relative to the circuit board 20.

Figure 6:
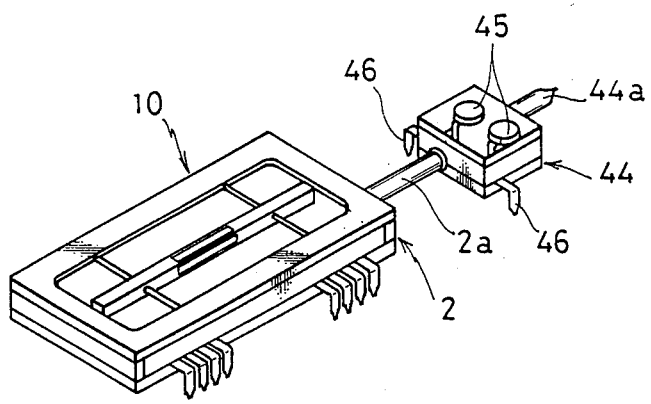
FIG. 6 is a perspective view for assistance in explaining the method of evacuating the sensor casing of the present invention.

FIG. 6 shows a process for airtightly enclosing the casing of the vibrational angular velocity sensor into a vacuum state. As shown in the drawing, a subcasing 44 is connected to the casing 2 of the vibrational angular velocity sensor assembly 10 via the connecting tube 2a.

Within this subcasing 44, getter 45 is disposed, and two terminals 46 for passing current through the getter 45 are led out of this subcasing 44.

Further, the insides of this subcasing 44 and the casing 2 are evacuated by a vacuum pump through a suction tube 44a attached to the subcasing 44 into some extent of vacuum (e.g. $10^{-5}$ Torr). Thereafter, the suction tube 44a is sealed.

Under these conditions, the subcasing 44 and the casing 2 are evacuated into a high vacuum by burning the getter 45 by current passed through the terminals 46. Thereafter, the connecting tube 2a connecting the casing 2 to the subcasing 44 is cut off and sealed to airtightly enclose the casing 2 into a high vacuum (e.g. $10^{-7}$ Torr).

As described above, when the getter 45 is burnt within the subcasing 44, it is possible to prevent the characteristics of the sensor vibrator within the casing from being deteriorated due to heat generated when the getter is burnt or to prevent the casing from being broken.

As described above, since the casing 2 can be maintained at a high vacuum, the vibrational angular sensor within the casing 2 is not subjected to change in external temperature or humidity in spite of the fact that no constant temperature tank is used. In addition, it is possible to reduce the viscous resistance of air to the vibrator.

As explained in the above embodiment, when glass is used for the vacuum casing of the vibrational angular velocity sensor, since the thermal conductivity and the thermal diffusivity are small as compared with those of metal such as Ni-Cr alloy, as listed below, it is possible to reduce the influence due to change in external temperature.

| Material | Thermal conductivity (Kcal/mh °C.) | Thermal diffusivity (m$^2$/h) |
|---|---|---|
| Ni-Cr alloy (Ni: 40%, Cr: 15%) | 10 | 0.011 |
| | Ni—Cr 0.65 | 0.0012 |
| Air (20° C.) | 0.0221 | 0.0789 |

As described above, according to the present invention, since the vibrational angular sensor is airtightly closed within a vacuum casing to reduce the influence of change in external temperature and humidity and viscous resistance upon the sensor vibrator, it is possible to provide a vibrational angular velocity sensor small in size, simple in structure and stable in detection characteristics.

Further, since the casing for housing the vibrational angular velocity vibrator and the subcasing for housing the getter are connected by a connecting tube and further this connecting tube is cut off and sealed after the getter has been burnt within the subcasing, it is possible to obtain a vibrational angular velocity sensor whose casing can be evacuated into a high vacuum without deteriorating the vibrator characteristics thermally and without being subjected to the influence of change in temperature.

Further, since no getter is disposed within the casing, it is possible to miniaturize the vibrational angular velocity sensor.

Further, since the surface of the casing for housing the vibrational angular velocity detector is coated with a metallic film to reduce the influence of external temperature change upon the vibrator by cutting off the external radiant heat with the metallic film, it is possible to obtain a vibrational angular velocity sensor provided with stable detection characteristics.

Further, since the lead pins connected to the signal input/output terminals of the vibrational angular velocity vibrator are led out toward the outside of the casing and further the vibrational angular velocity sensor is mounted on the printed circuit board by use of these lead pins, it is possible to facilitate the assembly of the sensor with the signal processing circuit and to reduce the influence of noise without use of conductive wiring.

Further, since the sensor is provided with a plurality of fixing pins whose ends are arranged with a constant length to mount the sensor assembly onto the printed circuit board, it is possible to facilitate the assembly to the signal processing circuit and to fix the vibrational angular velocity sensor assembly at a constant height stably by the use of the shoulder portions of the ends of the fixing pins.

Further, since the vibrator support pins for supporting the vibrator on the casing are fixed by glass fixing material within an enclosed casing to reduce thermal transmission from the outside and thus the influence of temperature change upon the vibrator, it is possible to obtain a the vibrational angular velocity sensor stable in detection characteristics.

What is claimed is:

1. A vibrational angular velocity sensor comprising:
   (a) an angular velocity vibration element;
   (b) a glass vacuum casing for housing said angular velocity vibration element in a vacuum, an inside surface of said glass vacuum casing being coated with a metallic film to exclude external radiant heat;
   (c) at least one support pin, fixed to said glass vacuum casing by glass material within said glass vacuum casing, for supporting said angular velocity vibration element;
   (d) a plurality of conductive lead pins extending from the inside to the outside of said glass vacuum casing, the inside ends of said conductive lead pins being connected to signal terminals of said angular velocity vibration element and the outside of said conductive lead pins being arranged with a constant length and connected to an outside printed circuit board for a velocity sensor signal processing circuit; and
   (e) a plurality of casing fixing pins also extending from the inside to the outside of said glass vacuum casing, the outside ends of said casing fixing pins being arranged with a constant length and fixed to the outside printed circuit board.

2. The vibrational angular velocity sensor of claim 1, wherein said vacuum casing is made of glass.

3. The vibrational angular velocity sensor of claim 1, wherein said vacuum casing is coated with a metallic film on inside surface of the casing to shut off external radiant heat.

4. The vibrational angular velocity sensor of claim 1, which further comprises a plurality of conductive lead pins connected to signal terminals of said angular velocity vibrator, ends of said conductive lead pins being arranged with a constant length outside said vacuum casing.

5. The vibrational angular velocity sensor of claim 1, which further comprises a plurality of fixing pins fixed to a printed circuit board for a velocity sensor signal processing circuit, ends of said fixing pins being arranged with a constant length outside said vacuum casing.

6. The vibrational angular velocity sensor of claim 2, which further comprises at least one support pin, fixed to said glass casing by glass material within said vacuum casing, for supporting said angular velocity vibrator.

7. A method of evacuating a casing of a vibrational angular velocity sensor into a vacuum, comprising the steps of:
   (a) connecting the casing for housing a vibrational angular velocity vibrator to a subcasing including getter through a connecting tube;
   (b) reducing pressure within the casing and the subcasing;
   (c) burning out the getter within the subcasing; and
   (d) sealing and cutting off the connecting tube from the subcasing.

* * * * *

UNITED STATES PATENT AND TRADEMARK OFFICE
CERTIFICATE OF CORRECTION

PATENT NO. : 4,898,031
DATED : February 6, 1990
INVENTOR(S) : TAKAHIRO OIKAWA ET AL Page 1 of 2

It is certified that error appears in the above-identified patent and that said Letters Patent is hereby corrected as shown below:

IN THE SPECIFICATION:

Column 1, line 40, before "getter" please insert --a--.

Column 2, line 12, please change "element" to --elements--;
line 16, please change "air" to --area--;
line 34, please change "eliminal" to --eliminate--.

Column 3, line 8, please change "leads" to --lead--.

Column 4, line 4, please change "for only" to --only for--;
line 40, after "as", please insert --a--.

Column 5, line 29, please change "led" to --lead--.

Column 6, lines 20-27, please delete the chart as shown and substitute the following:
--

| Material | Thermal conductivity (kcal/mh$^\circ$C) | Thermal diffusivity (m$^2$/h) |
|---|---|---|
| Ni-Cr alloy (Ni: 40%, Cr: 15%) | 10 | 0.011 |
| Glass | 0.65 | 0.0012 |
| Air (20$^\circ$C) | 0.0221 | 0.0789 |

--

UNITED STATES PATENT AND TRADEMARK OFFICE
CERTIFICATE OF CORRECTION

PATENT NO. : 4,898,031

DATED : February 6, 1990

INVENTOR(S) : TAKAHIRO OIKAWA ET AL

It is certified that error appears in the above-identified patent and that said Letters Patent is hereby corrected as shown below:

Column 7, line 10, please delete "the".

IN THE CLAIMS:

Column 8, Claim 3, line 7, after "on", please insert --the--;

Claim 4, line 12, before "ends", please insert --the--;

Claim 5, line 18, before "ends", please insert --the--;

Claim 7, line 29, after "including", please insert --a--.

Signed and Sealed this

Sixteenth Day of April, 1991

Attest:

HARRY F. MANBECK, JR.

Attesting Officer

Commissioner of Patents and Trademarks